(12) United States Patent
Harding et al.

(10) Patent No.: US 10,927,762 B2
(45) Date of Patent: Feb. 23, 2021

(54) COOLED COMPONENT

(71) Applicant: ROLLS-ROYCE PLC, London (GB)

(72) Inventors: Stephen Charles Harding, Bristol (GB); Nicholas Alexander Worth, Norwich (GB)

(73) Assignee: ROLLS-ROYCE plc, London (GB)

( * ) Notice: Subject to any disclaimer, the term of this patent is extended or adjusted under 35 U.S.C. 154(b) by 735 days.

(21) Appl. No.: 14/858,535

(22) Filed: Sep. 18, 2015

(65) Prior Publication Data

US 2016/0097325 A1    Apr. 7, 2016

(30) Foreign Application Priority Data

Oct. 2, 2014    (GB) ..................... 1417429

(51) Int. Cl.
*F02C 7/18*     (2006.01)
*F01D 5/18*     (2006.01)
(Continued)

(52) U.S. Cl.
CPC ............... *F02C 7/18* (2013.01); *F01D 5/186* (2013.01); *F01D 9/065* (2013.01); *F01D 25/12* (2013.01);
(Continued)

(58) Field of Classification Search
CPC .......... F01D 25/12; F01D 5/186; F01D 9/065; F02C 7/18; F05D 2260/202;
(Continued)

(56) References Cited

U.S. PATENT DOCUMENTS

| 4,197,443 A | 4/1980 | Sidenstick |
| 5,476,364 A | 12/1995 | Kildea |

(Continued)

FOREIGN PATENT DOCUMENTS

| CN | 103244196 A | 8/2013 |
| EP | 0227582 A2 | 7/1987 |
| GB | 1106989 A | 3/1968 |

OTHER PUBLICATIONS

Jun. 6, 2016 Search Report issued in European Patent Application No. 15185857.

(Continued)

*Primary Examiner* — Todd E Manahan
*Assistant Examiner* — Kyle Robert Thomas
(74) *Attorney, Agent, or Firm* — Oliff PLC

(57) ABSTRACT

A cooled gas turbine engine component comprises a wall which has a plurality of effusion cooling apertures extending there-through from a first surface to a second surface. The apertures are arranged at an angle to the second surface and each aperture has an inlet in the first surface and an outlet in the second surface. Each aperture has a metering portion and a diffusing portion arranged in flow series and each metering portion is elongate and the width is greater than the length of the metering portion. Each diffusing portion increases in dimension in the length from the metering portion to the outlet. Each outlet has a rectangular shape in the second surface of the wall. Each inlet has an elongate shape in the first surface of the wall and the inlet in the wall is arranged substantially diagonally with respect to the outlet in the wall.

23 Claims, 7 Drawing Sheets

(51) Int. Cl.
*F23R 3/06* (2006.01)
*F23R 3/00* (2006.01)
*F01D 9/06* (2006.01)
*F01D 25/12* (2006.01)
*F23R 3/04* (2006.01)

(52) U.S. Cl.
CPC ............... *F23R 3/002* (2013.01); *F23R 3/04* (2013.01); *F23R 3/06* (2013.01); *F05D 2250/13* (2013.01); *F05D 2260/201* (2013.01); *F05D 2260/202* (2013.01); *F23R 2900/00018* (2013.01); *F23R 2900/03041* (2013.01); *F23R 2900/03042* (2013.01); *F23R 2900/03043* (2013.01)

(58) Field of Classification Search
CPC .. F23R 2900/03041; F23R 2900/03042; F23R 2900/03043; F23R 3/04; F23R 3/06
See application file for complete search history.

(56) References Cited

U.S. PATENT DOCUMENTS

| | | | | |
|---|---|---|---|---|
| 6,408,629 | B1* | 6/2002 | Harris | F23R 3/06 60/754 |
| 7,546,737 | B2* | 6/2009 | Schumacher | F23R 3/002 60/754 |
| 8,850,828 | B2* | 10/2014 | Mongillo, Jr. | F01D 5/186 60/806 |
| 9,279,330 | B2* | 3/2016 | Xu | F01D 5/186 |
| 2007/0227149 | A1 | 10/2007 | Biebel et al. | |
| 2010/0068067 | A1* | 3/2010 | Liang | F01D 5/186 416/97 R |
| 2010/0172762 | A1* | 7/2010 | Rawlinson | F01D 5/186 416/97 R |
| 2012/0051941 | A1* | 3/2012 | Bunker | F01D 5/186 416/97 R |
| 2013/0031904 | A1* | 2/2013 | Garry | F23R 3/002 60/722 |
| 2013/0205791 | A1 | 8/2013 | Mongillo, Jr. et al. | |
| 2013/0206739 | A1* | 8/2013 | Reed | F01D 25/12 219/121.71 |
| 2013/0209229 | A1* | 8/2013 | Xu | F01D 9/041 415/115 |
| 2013/0269354 | A1* | 10/2013 | Starkweather | F23R 3/06 60/754 |
| 2014/0093389 | A1* | 4/2014 | Morris | F01D 5/183 416/97 R |
| 2014/0099189 | A1* | 4/2014 | Morris | F01D 5/186 415/115 |
| 2014/0338347 | A1* | 11/2014 | Gage | F23R 3/06 60/754 |

OTHER PUBLICATIONS

Mar. 15, 2015 Search Report issued in British Patent Application No. GB1417429.6.

* cited by examiner

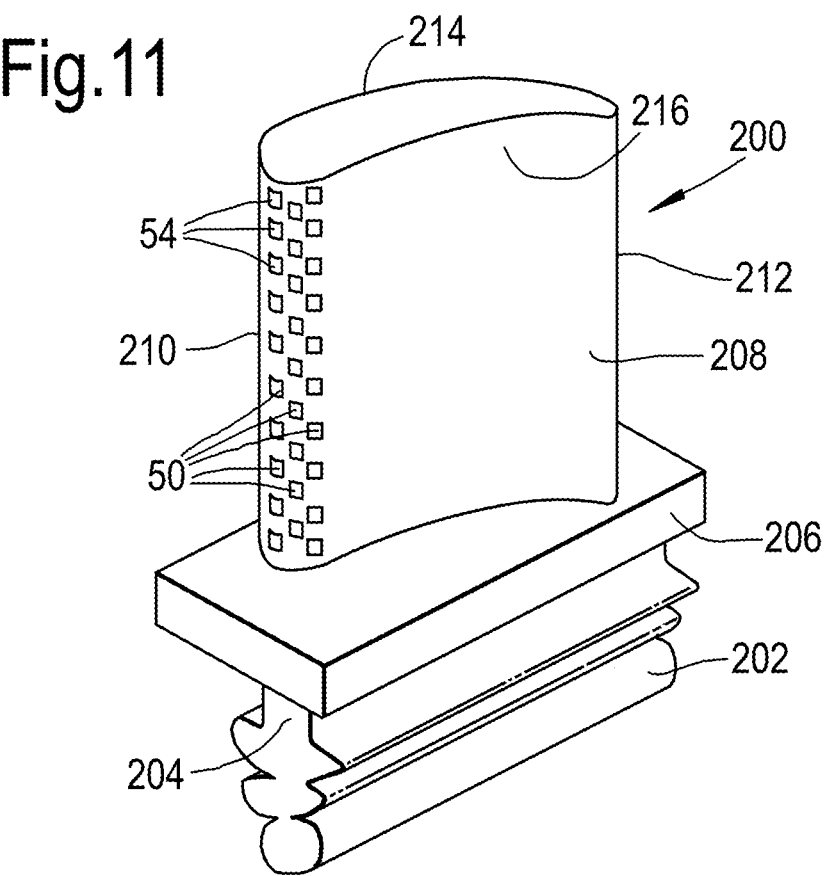
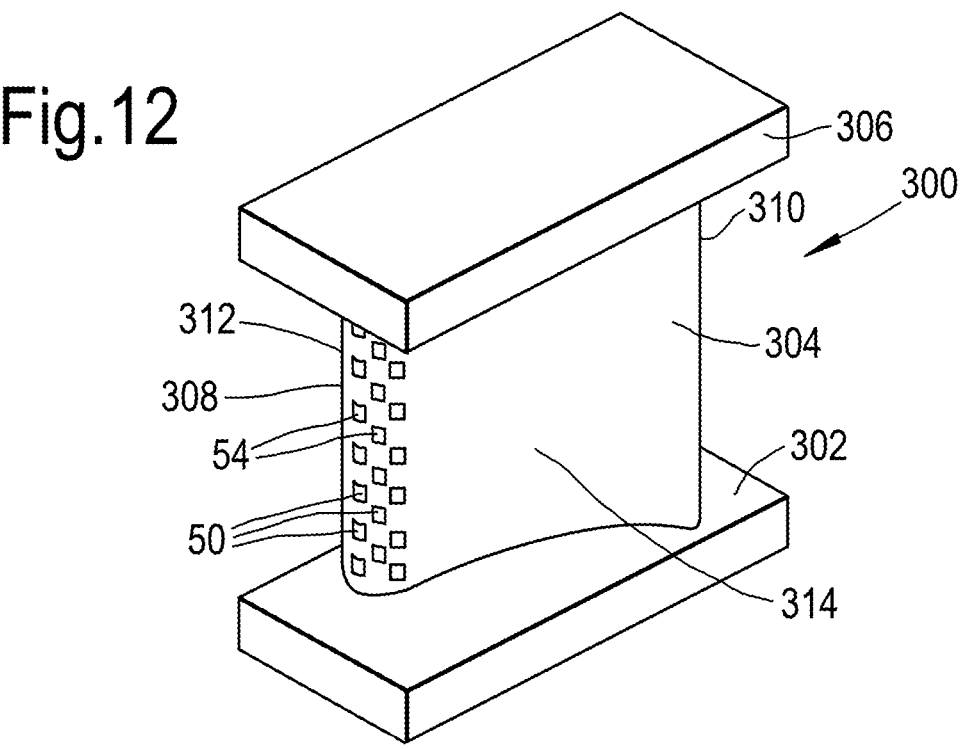

COOLED COMPONENT

FIELD OF THE INVENTION

The present invention relates to a cooled component and in particular to a cooled component of gas turbine engine.

BACKGROUND TO THE INVENTION

Components, for example turbine blades, turbine vanes, combustion chamber walls, of gas turbine engines and other turbomachines are cooled to maintain the component at a temperature where the material properties of the component are not adversely affected and the working life and the integrity of the component is maintained.

One method of cooling components, turbine blades, turbine vanes combustion chamber walls, of gas turbine engines provides a film of coolant on an outer surface of a wall of the component. The film of coolant is provided on the outer surface of the wall of the component by a plurality of effusion cooling apertures which are either arranged perpendicular to the outer surface of the wall or at an angle to the outer surface of the wall. The effusion apertures are generally manufactured by laser drilling, but other processes may be used, e.g. electro-chemical machining, electro-discharge machining or by casting. Effusion cooling apertures are often cylindrical and angled in the direction of flow of hot fluid over the outer surface of the component. Angled effusion cooling apertures have an increased internal surface area, compared to effusion cooling apertures arranged perpendicular to the outer surface of the wall of the component, and the increased internal surface area increases the heat transfer from the wall of the component to the coolant. Angled effusion apertures provide a film of coolant on the outer surface of the component which has improved quality compared to effusion cooling apertures arranged perpendicular to the outer surface of the wall of the component.

However, despite the use of cylindrical effusion cooling apertures angled in the direction of flow of hot fluid over the surface of the component, the coolant passing through the cylindrical effusion cooling apertures often retains a significant component of velocity in direction perpendicular to the surface of the component. This causes the jets of coolant exiting the cylindrical effusion cooling apertures to detach from the surface of the component and results in a poor film of coolant on the surface of the component. The high velocity of the jets of coolant also increases the mixing between the coolant and the hot fluid flowing over, or a hot fluid adjacent to, the surface of the component and this raises the temperature of the film of coolant and therefore reduces its cooling effect. Additionally there may be relatively large distances between adjacent effusion cooling apertures and this may result in a film of coolant which is non-uniform across the surface of the component and hence there may be hot spots on the surface of the component between effusion cooling apertures.

The use of a larger number of smaller diameter effusion cooling apertures, compared to a smaller number of larger diameter effusion cooling apertures, may be used to increase the internal surface area of the angled effusion apertures for the same total mass flow of coolant. However, it is expensive and time consuming to drill a large number of effusion cooling apertures using conventional manufacturing techniques, e.g. laser drilling, electro-chemical machining or electro-discharge machining.

The use of fanned effusion cooling apertures provides enhanced film cooling effectiveness, but fanned effusion cooling apertures have un-aerodynamic diffusion which suffers from flow separation and reduces its cooling effect.

Therefore the present invention seeks to provide a novel cooled component which reduces or overcomes the above mentioned problem.

SUMMARY OF THE INVENTION

Accordingly the present invention provides a cooled component comprising a wall having a first surface and a second surface, the wall having a plurality of effusion cooling apertures extending there-through from the first surface to the second surface, the effusion cooling apertures being arranged at an angle to the second surface, each aperture having an inlet in the first surface and an outlet in the second surface, each effusion cooling aperture having a metering portion and a diffusing portion arranged in flow series from the inlet to the outlet, each metering portion being elongate and having a width and length, the width of each metering portion being greater than the length of the metering portion, each diffusing portion increasing in dimension in the length from the metering portion to the outlet, each outlet having a quadrilateral shape in the plane of the second surface of the wall, each inlet having an elongate shape in the plane of the first surface of the wall and the inlet in the first surface of the wall being arranged substantially diagonally with respect to the outlet in the second surface of the wall.

Each outlet may have a rectangular shape, a parallelogram shape, a rhombus shape or an isosceles trapezium shape.

Each outlet may have a rectangular shape, each outlet is arranged such that two of the sides of the rectangular shape extend laterally and two of the sides of the rectangular shape extend longitudinally.

Each outlet may have a rhombus shape or an isosceles trapezium shape, each outlet is arranged such that two of the sides of the shape extend laterally and two of the sides of the rectangular shape extend longitudinally and laterally.

Each inlet may have a curved upstream end wall, a curved downstream end wall and curved side walls, the curved upstream end wall is concave, the curved downstream end wall is convex and the curved side walls are concave.

The curved upstream and downstream end walls may diverge in the longitudinal, axial, direction of the wall.

The effusion cooling apertures may be arranged in longitudinally spaced rows and the apertures in each row being laterally spaced apart.

The effusion cooling apertures in each row may be offset laterally from the effusion cooling apertures in each adjacent row.

The ratio of the width of the metering portion to the length of the metering portion may be from 3 to 1 to 8 to 1. The width of the metering portion may be from 0.9 mm to 2.4 mm and the length of the metering portion may be 0.3 mm.

The metering portion may be arranged at an angle of between 10° and 20° to the first surface.

The metering portion of the effusion cooling apertures may have a length of 0.3 mm and a width of 0.9 mm, the metering portion of the effusion cooling apertures is arranged at an angle of between 12° to the first surface, a first surface of the diffusing portion of the effusion cooling apertures is arranged at an angle of 12° to the second surface and a second opposite surface of the diffusing portion of the effusion cooling apertures is arranged at an angle of 7° to the first surface of the diffusing portion of the effusion cooling aperture to form the diffusing portion.

The metering portion of the effusion cooling apertures may have a length of 0.3 mm and a width of 0.9 mm, the metering portion of the effusion cooling apertures is arranged at an angle of 17° to the first surface, a first surface of the diffusing portion of the effusion cooling apertures is arranged at an angle of 17° to the second surface and a second opposite surface of the diffusing portion of the effusion cooling apertures is arranged at an angle of 6° to the first surface of the diffusing portion of the effusion cooling aperture to form the diffusing portion.

The effusion cooling apertures in each row may be spaced apart by 1 mm in the second surface and the effusion cooling apertures in adjacent rows may be spaced apart by 7 mm in the second surface.

The cooled component may comprise a second wall, the second wall having a third surface and a fourth surface, the fourth surface of the second wall being spaced from the first surface of the wall and the second wall having a plurality of impingement cooling apertures extending there-through from the third surface to the fourth surface.

The metering portion of the effusion cooling apertures may have a length of 0.3 mm and a width of 2.4 mm, the metering portion of the effusion cooling apertures is arranged at an angle of 16° to the first surface, a first surface of the diffusing portion of the effusion cooling aperture is arranged at an angle of 16° to the second surface, a second opposite surface of the diffusing portion is arranged at an angle of 6° to the first surface of the diffusing portion of the effusion cooling aperture to form the diffusing portion.

The effusion cooling apertures in each row may be spaced apart by 3.4 mm in the second surface and the effusion cooling apertures in adjacent rows may be spaced apart by 4.7 mm in the second surface.

The rectangular shape may be square.

The cooled component may be a turbine blade, a turbine vane, a combustion chamber wall, a combustion chamber tile, a combustion chamber heat shield, a combustion chamber wall segment or a turbine shroud.

The cooled combustion chamber wall may be an annular combustion chamber wall and the annular combustion chamber wall has each outlet arranged such that the two of the sides of the rectangular shape which extend laterally extend circumferentially of the combustion chamber wall and the two of the sides of the rectangular shape which extend longitudinally extend axially of the combustion chamber wall. The effusion cooling apertures being arranged in axially spaced rows and the apertures in each row being circumferentially spaced apart. The effusion cooling apertures in each row are offset circumferentially from the effusion cooling apertures in each adjacent row.

The cooled combustion chamber tile may be a combustion chamber tile for an annular combustion chamber wall and the combustion chamber tile has each outlet arranged such that the two of the sides of the rectangular shape which extend laterally extend circumferentially of the combustion chamber tile and the two of the sides of the rectangular shape which extend longitudinally extend axially of the combustion chamber tile. The effusion cooling apertures being arranged in axially spaced rows and the apertures in each row being circumferentially spaced apart. The effusion cooling apertures in each row are offset circumferentially from the effusion cooling apertures in each adjacent row.

The cooled combustion chamber wall segment may be a combustion chamber wall segment for an annular combustion chamber wall and the combustion chamber wall segment comprises an outer wall and an inner wall spaced from the outer wall, the outer wall has a plurality of impingement cooling apertures and the inner wall has a plurality of effusion cooling apertures, the inner wall has each outlet arranged such that the two of the sides of the rectangular shape which extend laterally extend circumferentially of the combustion chamber segment and the two of the sides of the rectangular shape which extend longitudinally extend axially of the combustion chamber segment. The effusion cooling apertures being arranged in axially spaced rows and the apertures in each row being circumferentially spaced apart. The effusion cooling apertures in each row are offset circumferentially from the effusion cooling apertures in each adjacent row.

The cooled turbine blade, or turbine vane, may have each outlet arranged such that the two of the sides of the rectangular shape which extend laterally extend radially of the turbine blade, or turbine vane, and the two of the sides of the rectangular shape which extend longitudinally extend axially of the turbine blade or turbine vane. The effusion cooling apertures may be arranged in axially spaced rows and the apertures in each row being radially spaced apart. The effusion cooling apertures in each row may be offset radially from the effusion cooling apertures in each adjacent row.

The cooled component may comprise a superalloy, for example a nickel, or cobalt, superalloy.

The cooled component may be manufactured by additive layer manufacturing, for example direct laser deposition.

The cooled component may be a gas turbine engine component or other turbomachine component, e.g. a steam turbine, or an internal combustion engine etc.

The gas turbine engine may be an aero gas turbine engine, an industrial gas turbine engine, a marine gas turbine engine or an automotive gas turbine engine. The aero gas turbine engine may be a turbofan gas turbine engine, a turbo-shaft gas turbine engine, a turbo-propeller gas turbine engine or a turbojet gas turbine engine.

BRIEF DESCRIPTION OF THE DRAWINGS

The present disclosure will be more fully described by way of example with reference to the accompanying drawings, in which:—

FIG. 11 is an enlarged perspective view of cooled turbine blade according to the present disclosure.

FIG. 12 is an enlarged perspective view of a cooled turbine vane according to the present disclosure.

DETAILED DESCRIPTION

Figure 1:
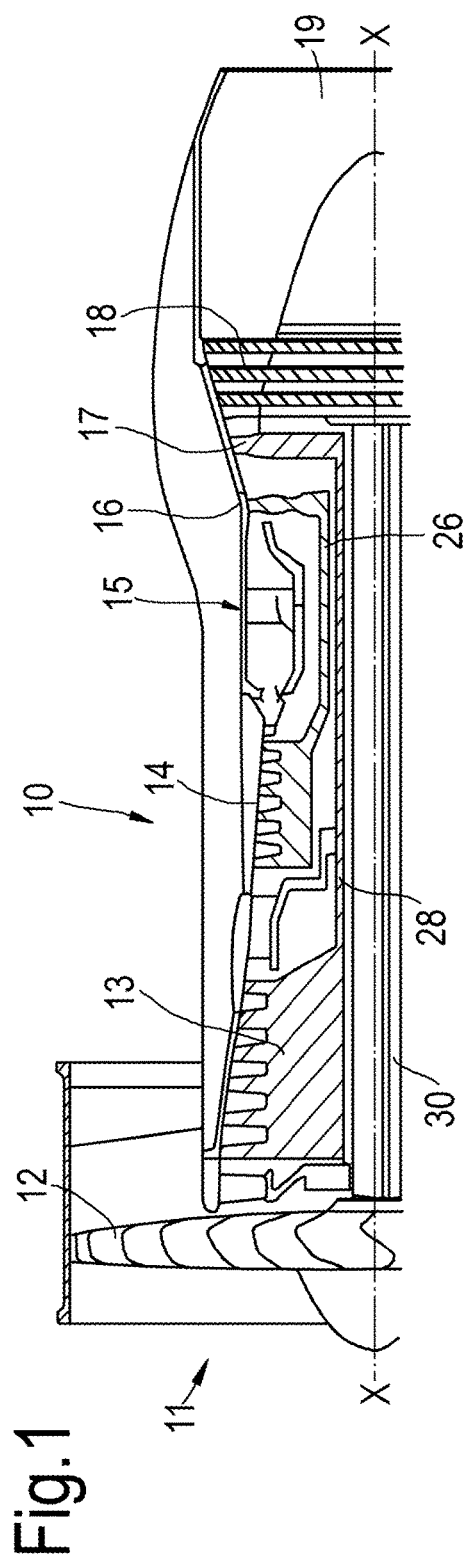
FIG. 1 is partially cut away view of a turbofan gas turbine engine having a cooled combustion chamber wall according to the present disclosure.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
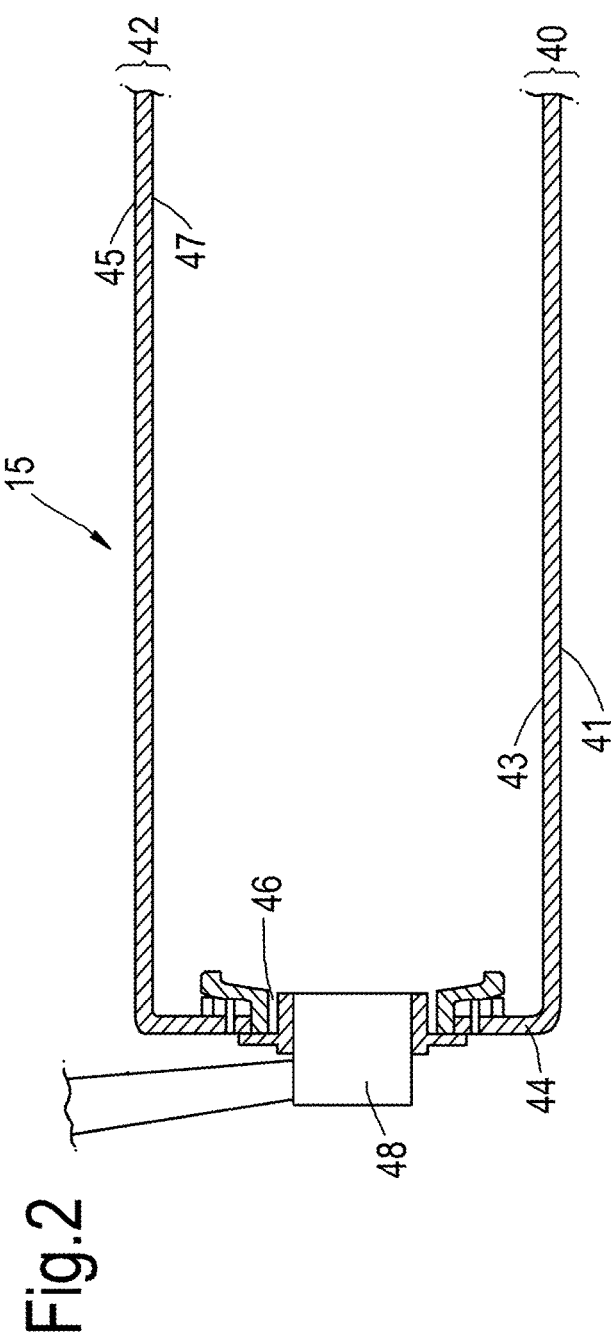
FIG. 2 is an enlarged cross-sectional view of a cooled combustion chamber wall according to the present disclosure.

The combustion chamber 15, as shown more clearly in FIG. 2, is an annular combustion chamber and comprises a radially inner annular wall 40, a radially outer annular wall structure 42 and an upstream end wall 44. The upstream end of the radially inner annular wall 40 is secured to the upstream end wall structure 44 and the upstream end of the radially outer annular wall 42 is secured to the upstream end wall 44. The upstream end wall 44 has a plurality of circumferentially spaced apertures 46 and each aperture 46 has a respective one of a plurality of fuel injectors 48 located therein. The fuel injectors 48 are arranged to supply fuel into the annular combustion chamber 15 during operation of the gas turbine engine 10 and as mentioned above the fuel is burnt in air supplied into the combustion chamber 15.

The radially inner annular wall 40 and the radially outer annular wall 42 are cooled components of the turbofan gas turbine engine 10. The radially inner annular wall 40 has a first surface 41 and a second surface 43 and similarly the radially outer annular wall 42 has a first surface 45 and a second surface 47.

Figure 3:
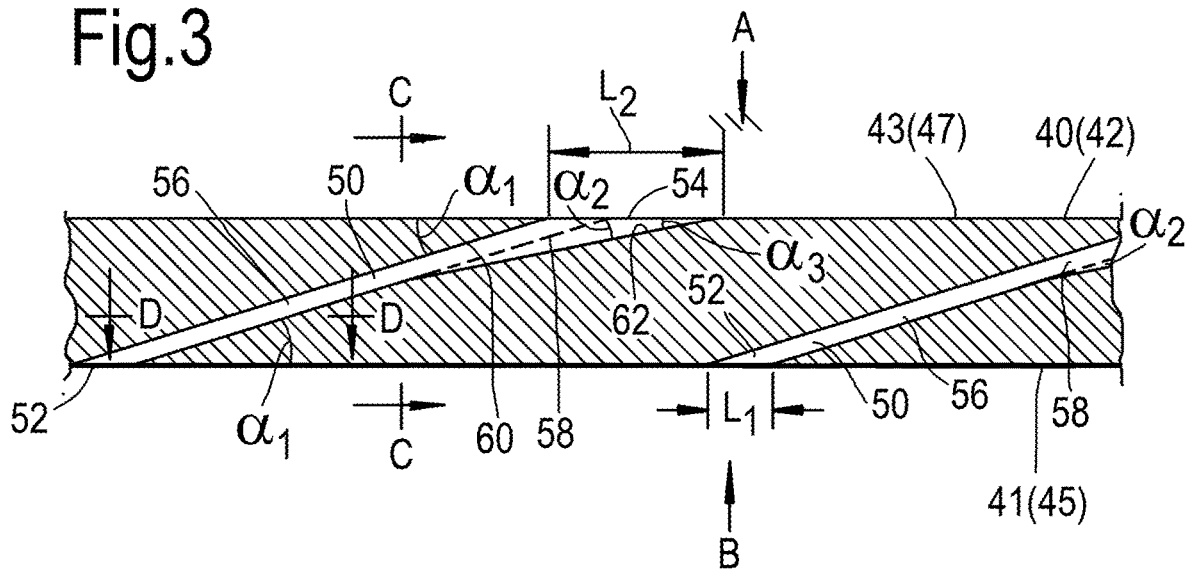
FIG. 3 is an enlarged cross-sectional view through the cooled combustion chamber wall shown in FIG. 2.
Figure 4:
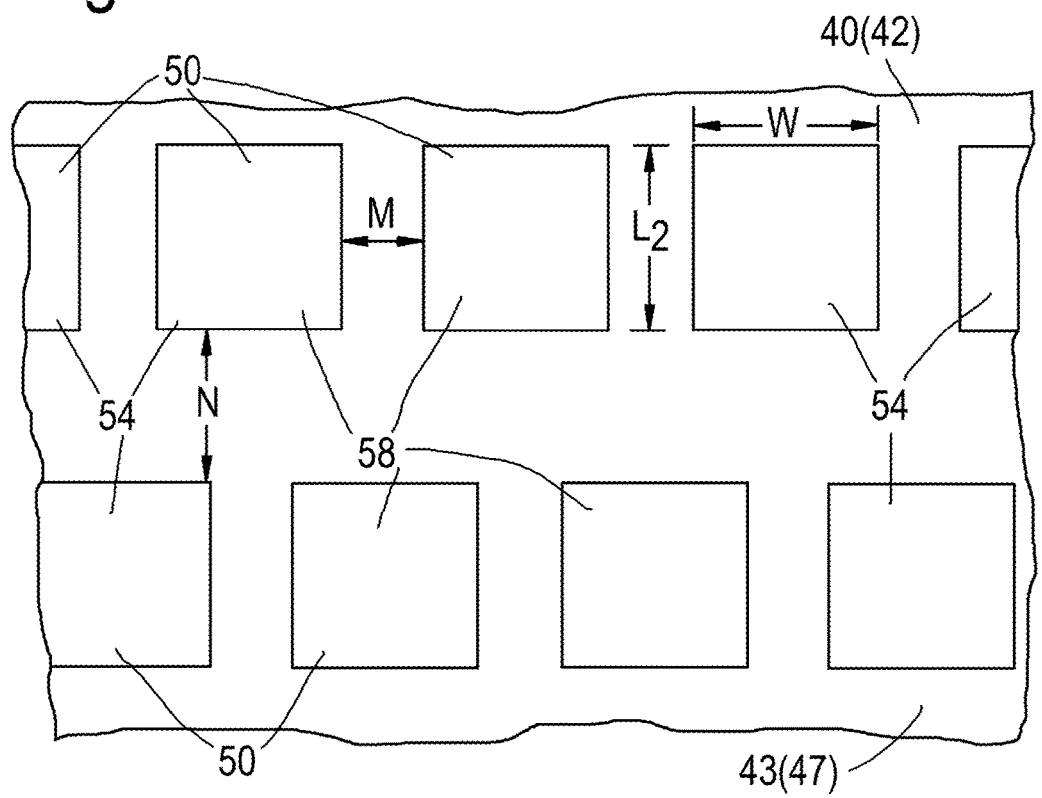
FIG. 4 is a view of the cooled combustion chamber wall in the direction of arrow A in FIG. 3.
Figure 5:
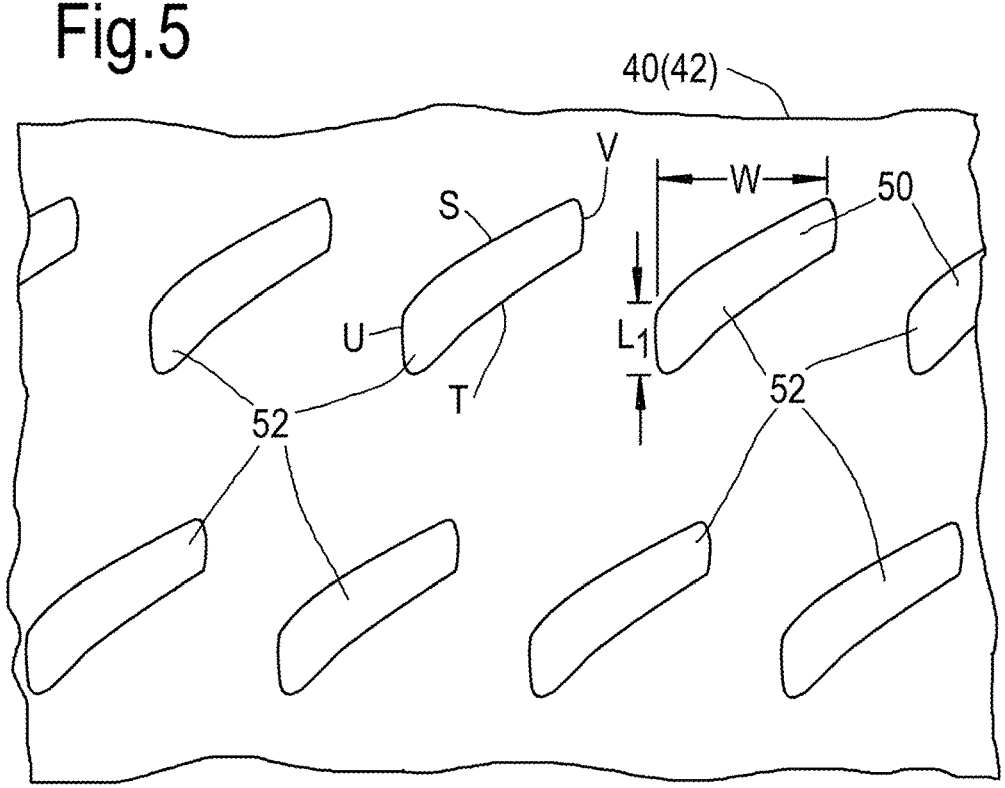
FIG. 5 is a view of the cooled combustion chamber wall in the direction of arrow B in FIG. 3.
Figure 6:
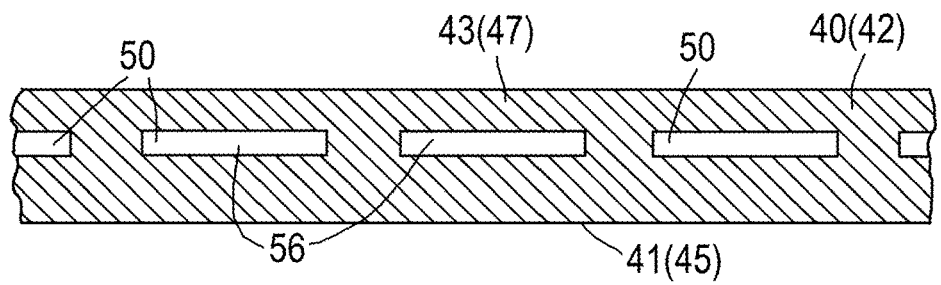
FIG. 6 is a cross-sectional view in the direction of arrows C-C in FIG. 3.
Figure 7:
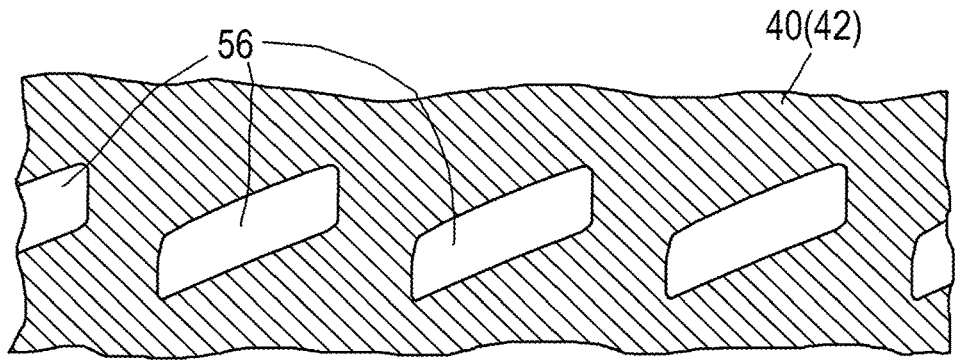
FIG. 7 is a cross-sectional view in the direction of arrows D-D in FIG. 3.
Figure 8:
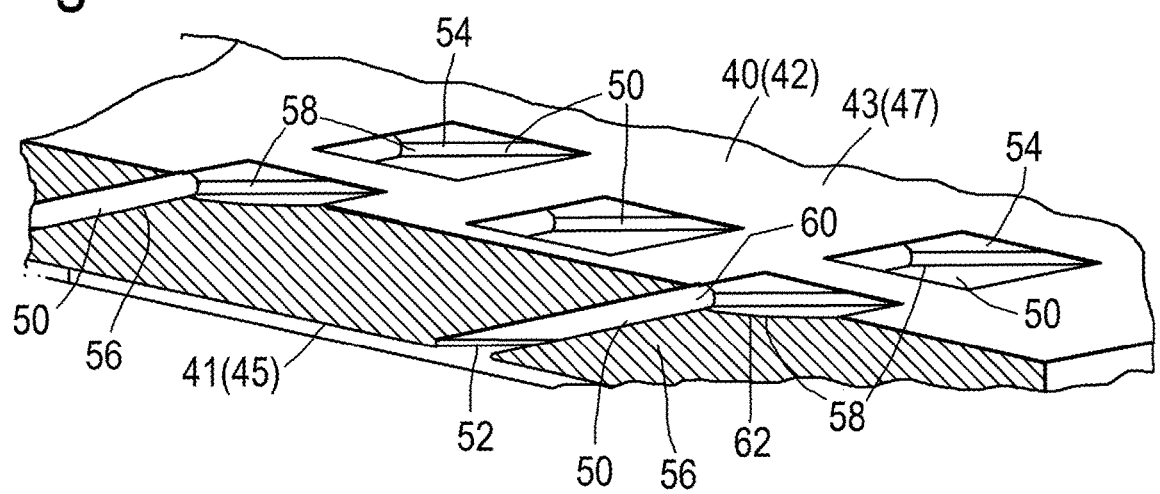
FIG. 8 is a part cut-away perspective view of the cooled combustion chamber wall in FIG. 2.

The radially inner annular wall 40 has a plurality of effusion cooling apertures 50 extending there-through from the first surface 41 to the second surface 43, as shown more clearly in FIGS. 3 to 8. The effusion cooling apertures 50 are arranged at an angle $\alpha_1$ to the first surface 41 and to the second surface 43 as shown in FIG. 3. Each aperture 50 has an inlet 52 in the first surface 41 and an outlet 54 in the second surface 43. Each effusion cooling aperture 50 has a metering portion 56 and a diffusing portion 58 arranged in flow series from the inlet 52 to the outlet 54. Each metering portion 56 is elongate and has a width W and length $L_1$ and the width W of each metering portion 56 is greater than the length $L_1$ of the metering portion 56, as shown in FIG. 5.

Each diffusing portion 58 increases in dimension in length from the length $L_1$ at the metering portion 56 to a length $L_2$ at the outlet 54 and each outlet 54 has a rectangular shape in the plane of the second surface 43 of the radially inner annular wall 40, as shown in FIG. 4. Each inlet 52 has an elongate shape in the plane of the first surface 41 of the radially inner annular wall 40 and the inlet 52 in the first surface 41 of the radially inner annular wall 40 is arranged substantially diagonally with respect to the outlet 54 in the second surface 43 of the radially inner annular wall 40. Each inlet 52 has a curved upstream end wall S, a curved downstream end wall T and curved side walls U and V, the curved upstream end wall S is concave, the curved downstream end wall T is convex and the curved side walls U and V are concave. The curved upstream and downstream end walls S and T diverge in the longitudinal, axial, direction of the radially inner annular wall 40, as shown in FIG. 5. Each outlet 54 is arranged such that the two of the sides of the rectangular shape extend laterally and two of the sides of the rectangular shape extend longitudinally and in particular the two of the sides of the rectangular shape which extend laterally extend circumferentially of the radially inner annular wall 40 and the two of the sides of the rectangular shape which extend longitudinally extend axially of the radially inner annular wall 40. The effusion cooling apertures 50 are arranged in longitudinally spaced rows and the apertures 50 in each row are laterally spaced apart and in particular the effusion cooling apertures 50 are arranged in axially spaced rows and the apertures 50 in each row are circumferentially spaced apart. The effusion cooling apertures 50 in each row are offset laterally from the effusion cooling apertures 50 in each adjacent row and in particular the effusion cooling apertures 50 in each row are offset circumferentially from the effusion cooling apertures 50 in each adjacent row.

It is to be noted that the inlet 52 of each effusion cooling aperture 50 is arranged substantially diagonally, extending with lateral, circumferential, and longitudinal, axial, components and the outlet 54 of each effusion cooling aperture 52 is rectangular in shape. The metering portion 56 of each effusion cooling aperture 50 gradually changes the effusion cooling aperture 50 from the diagonal alignment to a rectangular shape at the junction of the metering portion 56 and the diffusing portion 58, as shown in FIGS. 3 to 8. The gradual changes in the effusion cooling aperture 50 between the diagonal alignment to the rectangular shape at the junction of the metering portion 56 and the diffusing portion 58 are preferably designed to be aerodynamic. The outlet 54 of the effusion cooling aperture 50 is designed to aerodynamically blend from the diffusing portion 58 to the second surface 53.

The ratio of the width W of the metering portion 56 to the length $L_1$ of the metering portion 56 may be from 3 to 1 to 8 to 1. The width W of the metering portion 56 may be from 0.9 mm to 2.4 mm and the length $L_1$ of the metering portion 56 may be 0.3 mm.

The metering portion 56 of each effusion cooling aperture 50 may be arranged at an angle $\alpha_1$ of between 10° and 20° to the first surface 41.

In one arrangement the metering portion 56 of the effusion cooling apertures 50 have a length of 0.3 mm and a width of 0.9 mm, the metering portion 56 of the effusion cooling apertures 50 is arranged at an angle of 12° to the first surface 41, a first surface 60 of the diffusing portion 58 of the effusion cooling apertures 50 is arranged at an angle $\alpha_1$ of 12° to the second surface 43 and a second opposite surface 62 of the diffusing portion 58 of the effusion cooling apertures 50 is arranged at an angle $\alpha_2$ of 7° to the first surface 60 of the diffusing portion 58 of the effusion cooling aperture 50 to form the diffusing portion 58 and therefore at an angle $\alpha_3$ of 5° to the second surface 43. The surface 62 of the diffusing portion 58 of the effusion cooling aperture 50 forms the bottom surface of a recess in the second surface 43 of the wall 40.

In another arrangement the metering portion 56 of the effusion cooling apertures 50 have a length of 0.3 mm and a width of 0.9 mm, the metering portion 56 of the effusion cooling apertures 50 is arranged at an angle $\alpha_1$ of 17° to the first surface 41, a first surface 60 of the diffusing portion 58 of the effusion cooling apertures 50 is arranged at an angle $\alpha_1$ of 17° to the second surface 43 and a second opposite surface 62 of the diffusing portion 58 of the effusion cooling apertures 50 is arranged at an angle $\alpha_2$ of 6° to the first surface 60 of the diffusing portion 58 of the effusion cooling aperture 50 to form the diffusing portion 58 and therefore at an angle $\alpha_3$ of 11° to the second surface 43. The surface 62 of the diffusing portion 58 of the effusion cooling aperture 50 forms the bottom surface of a recess in the second surface 43 of the wall 40.

The effusion cooling apertures 50 in each row may be spaced apart by a distance M of 1 mm in the second surface 43 and the effusion cooling apertures 50 in adjacent rows may be spaced apart by a distance N of 7 mm in the second surface 53.

The radially outer annular wall 42 has a plurality of effusion cooling apertures 50 extending there-through from the first surface 41 to the second surface 43, as shown more clearly in FIGS. 3 to 8 and these effusion cooling apertures 50 are arranged substantially the same as the effusion cooling apertures 50 in the radially inner annular wall 40.

In operation coolant, for example air supplied from the high pressure compressor 14 of the gas turbine engine 10, flowing over the radially inner and outer annular walls 40 and 42 respectively is supplied through the effusion cooling apertures 50 from the first surface 41 or 45 to the second surface 43 or 47 of the radially inner and outer annular walls 40 and 42 respectively. The flow of coolant through the effusion cooling apertures 50 exits the effusion cooling apertures 50 and then flows over the second surfaces 43 or 47 of the radially inner and outer annular walls 40 and 42 respectively to form a film of coolant on the second surfaces 43 or 47 of the radially inner and outer annular walls 40 and 42 respectively.

Figure 9:
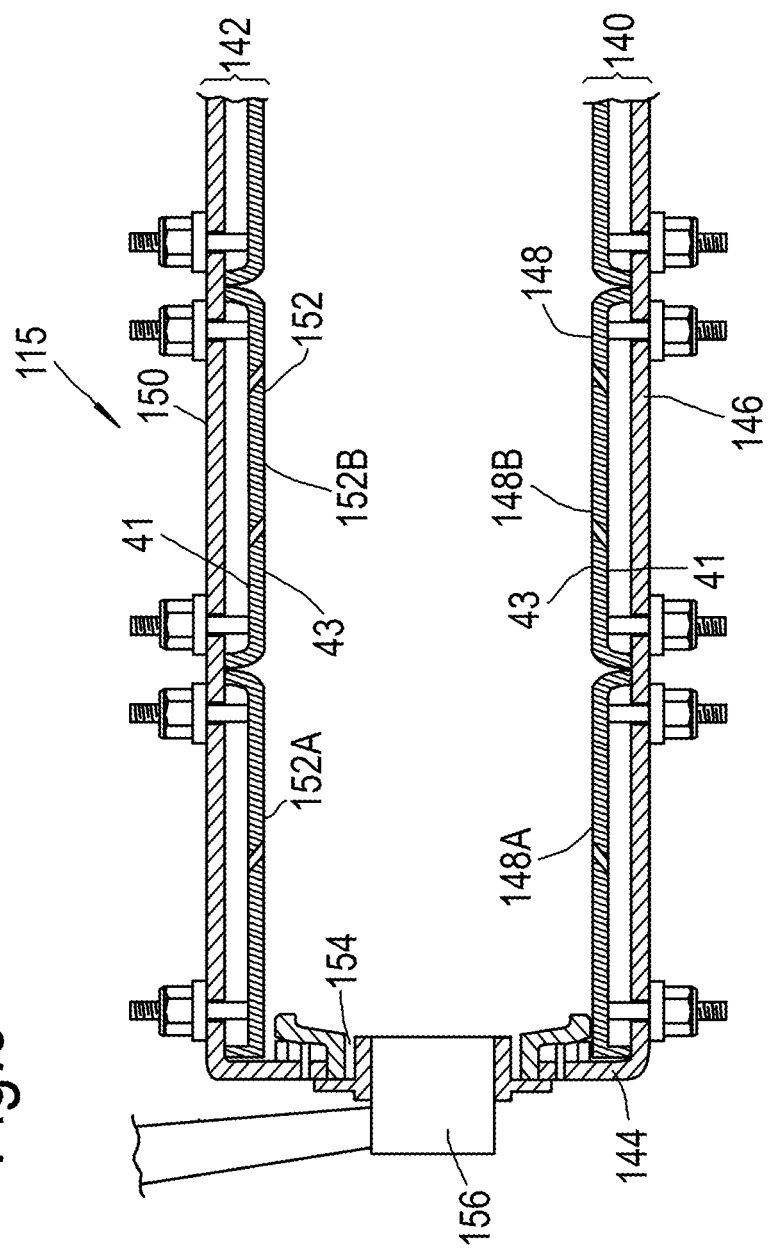
FIG. 9 is an enlarged cross-sectional view of an alternative cooled combustion chamber wall according to the present disclosure.

Another combustion chamber 115, as shown more clearly in FIG. 9, is an annular combustion chamber and comprises a radially inner annular wall structure 140, a radially outer annular wall structure 142 and an upstream end wall structure 144. The radially inner annular wall structure 140 comprises a first annular wall 146 and a second annular wall 148. The radially outer annular wall structure 142 comprises a third annular wall 150 and a fourth annular wall 152. The second annular wall 148 is spaced radially from and is arranged radially around the first annular wall 146 and the first annular wall 146 supports the second annular wall 148. The fourth annular wall 152 is spaced radially from and is arranged radially within the third annular wall 150 and the third annular wall 150 supports the fourth annular wall 152. The upstream end of the first annular wall 146 is secured to the upstream end wall structure 144 and the upstream end of the third annular wall 150 is secured to the upstream end wall structure 144. The upstream end wall structure 144 has a plurality of circumferentially spaced apertures 154 and each aperture 154 has a respective one of a plurality of fuel injectors 156 located therein. The fuel injectors 156 are arranged to supply fuel into the annular combustion chamber 115 during operation of the gas turbine engine 10.

The second annular wall 148 comprises a plurality of rows of combustor tiles 148A and 148B and the fourth annular wall 152 comprises a plurality of rows of combustor tiles 152A and 152B. The combustor tiles 148A and 148B have threaded studs and nuts to secure the combustor tiles 148A and 148B onto the first annular wall 146 and the combustor tiles 152A and 152B have threaded studs and nuts to secure the combustor tiles 152A and 152B onto the third annular wall 150. Alternatively, the combustor tiles 148A and 148B may be secured to the first annular wall 146 by threaded bosses and bolts and the combustor tiles 152A and 152B may be secured to the third annular wall 150 by threaded bosses and bolts.

The combustor tiles 148A, 148B, 152A and 152B are cooled components of the turbofan gas turbine engine 10. Each of the combustor tiles 148A, 148B, 152A and 152B has a first surface 41 and a second surface 43. The combustion chamber tiles 148A, 148B, 152A and 152B are for annular combustion chamber wall 140 and 142 and each combustion chamber tile 148A, 148B, 152A and 152B has effusion cooling apertures 50, as shown in FIGS. 3 to 8. Each combustion chamber tile 148A, 148B, 152A and 152B has each outlet 54 arranged such that the two of the sides of the rectangular shape which extend laterally extend circumferentially of the combustion chamber tile 148A, 148B, 152A and 152B and the two of the sides of the rectangular shape which extend longitudinally extend axially of the combustion chamber tile 148A, 148B, 152A and 152B. The effusion cooling apertures 50 are arranged in axially spaced rows and the apertures 50 in each row are circumferentially spaced apart. The effusion cooling apertures 50 in each row are offset circumferentially from the effusion cooling apertures 50 in each adjacent row.

The first annular wall 146 and the third annular wall 150 are provided with a plurality of impingement cooling apertures extending there-through to direct coolant onto the first surfaces 41 of the combustor tiles 148A, 148B, 152A and 152B.

The combustor tiles 148A, 148B, 152A and 152B may have lands, e.g. pedestals, pins, fins, extending from the first surfaces 41 towards the first annular wall 146 and third annular wall 150 respectively. The impingement cooling apertures may be circular, elliptical or slotted, e.g. rectangular, in cross-section. The impingement cooling apertures may have a shaped, curved, inlet to form a bell-mouth inlet.

The metering portion 56 of the effusion cooling apertures 50 have a length of 0.3 mm and a width of 2.4 mm, the metering portion 56 of the effusion cooling apertures 50 is arranged at an angle $\alpha_1$ of 16° to the first surface 41. A first surface 60 of the diffusing portion 56 of the effusion cooling aperture 50 is arranged at an angle $\alpha_1$ of 16° to the second surface 43 and a second opposite surface 62 of the diffusing portion 58 is arranged at an angle $\alpha_2$ of 6° to the first surface 60 of the diffusing portion 58 of the effusion cooling aperture 50 to form the diffusing portion 58 and therefore at an angle $\alpha_3$ of 10° to the second surface 43. The surface 62 of the diffusing portion 58 of the effusion cooling aperture 50 forms the bottom surface of a recess in the second surface 43 of the wall 40.

The effusion cooling apertures 50 in each row are spaced apart by a distance M of 3.4 mm in the second surface 43 and the effusion cooling apertures 50 in adjacent rows may be spaced apart by a distance N of 4.7 mm in the second surface 43.

In operation coolant, for example air supplied from the high pressure compressor 14 of the gas turbine engine 10, flowing over the radially inner and outer annular wall structures 140 and 142 respectively is supplied through the impingement cooling apertures in the first and third annular walls 146 and 150 and onto the first surfaces 41 of the combustor tiles 148A, 148B, 152A and 152B of the second and fourth annular walls 148 and 152 to provide impingement cooling of the combustor tiles 148A, 148B, 152A and 152B. The coolant then flows through the effusion cooling apertures 50 in the combustor tiles 148A, 148B, 152A and 152B of the second and fourth annular walls 148 and 152 from the first surface 41 to the second surface 43 of the combustor tiles 148A, 148B, 152A and 152B of the second and fourth annular walls 148 and 152 radially inner and outer annular wall structures 140 and 142 respectively. The flow of coolant through the effusion cooling apertures 50 exits the effusion cooling apertures 50 and then flows over the second surfaces 43 of the combustor tiles 148A, 148B, 152A and 152B of the second and fourth annular walls 148 and 152 of the radially inner and outer annular wall structures 140 and 142 respectively to form a film of coolant on the second surfaces 43 of the combustor tiles 148A, 148B, 152A and 152B of the second and fourth annular walls 148 and 152 of the radially inner and outer annular wall structures 140 and 142 respectively.

Figure 10:
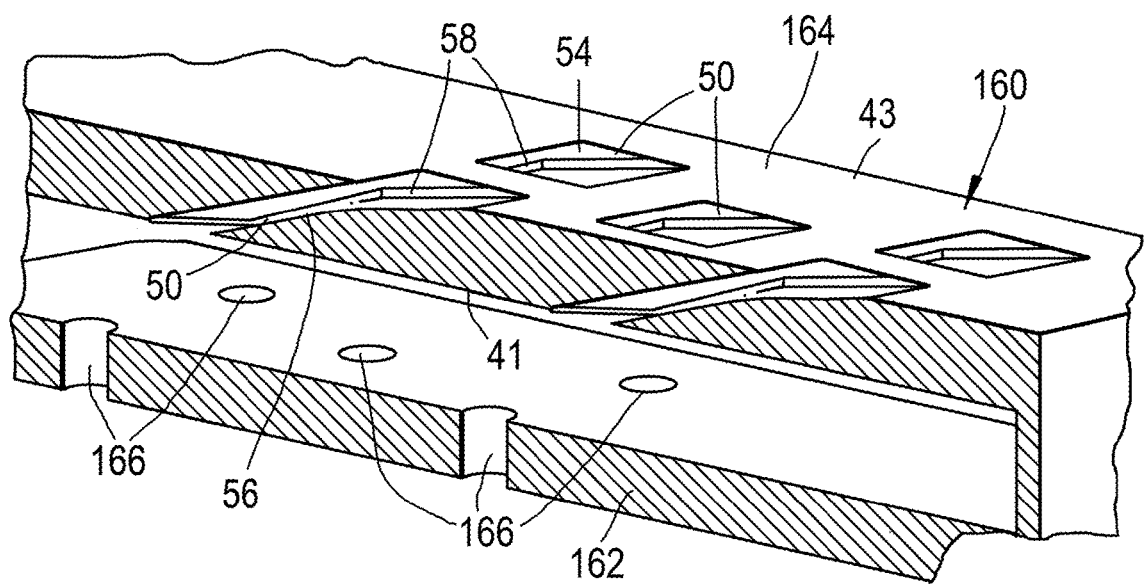
FIG. 10 is a part cut-away perspective view of a further cooled combustion chamber wall according to the present disclosure.

In another arrangement, not shown, an annular combustion chamber wall comprises a plurality of wall segments and each of the combustion chamber wall segments is a cooled component of the gas turbine engine. Each combustion chamber wall segment forms a predetermined angular portion of the annular combustion chamber wall and the combustion chamber wall segments are arranged circumferentially side by side to form the annular combustion chamber wall. Each combustion chamber wall segment 160, as shown in FIG. 10, comprises an outer wall 162 and an inner wall 164 spaced from the outer wall 162, the outer wall 162 has a plurality of impingement cooling apertures 166 and the inner wall 164 has a plurality of effusion cooling apertures 50 as shown in FIGS. 3 to 8. The inner wall 164 has each outlet 54 arranged such that the two of the sides of the rectangular shape which extend laterally extend circumferentially of the combustion chamber segment 160 and the two of the sides of the rectangular shape which extend longitudinally extend axially of the combustion chamber segment 160. The effusion cooling apertures 50 are arranged in axially spaced rows and the apertures 50 in each row are circumferentially spaced apart. The effusion cooling apertures 50 in each row are offset circumferentially from the effusion cooling apertures 50 in each adjacent row. The combustion chamber wall segments 160 may have lands, e.g. pedestals, pins, fins, extending from the inner wall 164 to the outer wall 162 and joining the inner wall 164 to the outer wall 162. The impingement cooling apertures 166 may be circular, elliptical or slotted, e.g. rectangular, in cross-section. The impingement cooling apertures 166 may have a shaped, curved, inlet to form a bell-mouth inlet.

Again the metering portion of the effusion cooling apertures have a length of 0.3 mm and a width of 2.4 mm, the metering portion of the effusion cooling apertures is arranged at an angle of 16° to the first surface, a first surface of the diffusing portion of the effusion cooling aperture is arranged at an angle of 16° to the second surface, a second opposite surface of the diffusing portion is arranged at an angle of 6° to the first surface of the diffusing portion of the effusion cooling aperture to form the diffusing portion and therefore at an angle $\alpha_3$ of 10° to the second surface 43. The surface 62 of the diffusing portion 58 of the effusion cooling aperture 50 forms the bottom surface of a recess in the second surface 43 of the wall 40.

The effusion cooling apertures in each row may be spaced apart by a distance M of 3.4 mm in the second surface and the effusion cooling apertures in adjacent rows may be spaced apart by a distance N of 4.7 mm in the second surface.

The constraint on the spacing between the effusion cooling apertures is a compound angle between the effusion cooling aperture geometries and hence the distances M and N are more generally at least 0.8 mm.

This operates in a similar manner to the arrangement in FIGS. 3 to 8 and FIG. 9.

A turbine blade 200, as shown more clearly in FIG. 11, comprises a root portion 202, a shank portion 204, a platform portion 206 and an aerofoil portion 208. The aerofoil portion 208 has a leading edge 210, a trailing edge 212, convex wall 214 and a concave wall 216 and the convex and concave walls 214 and 216 extend from the leading edge 210 to the trailing edge 212. The turbine blade 200 is hollow and has a plurality of passages formed therein and is a cooled component of the gas turbine engine 10. The cooled turbine blade 200 has a plurality of effusion cooling apertures 50 extending through the convex and concave walls 214 and 216 respectively of the aerofoil portion 208 to cool the aerofoil portion 208 of the turbine blade 200. The effusion cooling apertures 50 are the same as those shown in FIGS. 3 to 8. Each outlet 54 is arranged such that the two of the sides of the rectangular shape which extend laterally extend radially of the turbine blade 200 and the two of the sides of the rectangular shape which extend longitudinally extend axially of the turbine blade 200. The effusion cooling apertures 50 are arranged in axially spaced rows and the apertures 50 in each row are radially spaced apart. The effusion cooling apertures 50 in each row are offset radially from the effusion cooling apertures 50 in each adjacent row.

In operation coolant, for example air supplied from the high pressure compressor 14 of the gas turbine engine 10, is supplied into the passages within the turbine blade 200 and the coolant flows through the effusion cooling apertures 50 from the first surface 41 to the second surface 43 of the convex and concave walls 214 and 216 respectively of the aerofoil portion 208. The flow of coolant through the effusion cooling apertures 50 exits the effusion cooling apertures 50 and then flows over the second surfaces 43 of the convex and concave walls 214 and 216 respectively of the aerofoil portion 208 to form a film of coolant on the second surfaces 43 of the convex and concave walls 214 and 216 respectively of the aerofoil portion 208.

A turbine vane 300, as shown more clearly in FIG. 12, comprises an inner platform portion 302, an aerofoil portion 304 and an outer platform portion 306. The aerofoil portion 304 has a leading edge 308, a trailing edge 310, convex wall 312 and a concave wall 314 and the convex and concave walls 312 and 314 extend from the leading edge 308 to the trailing edge 310. The turbine vane 300 is hollow and has a plurality of passages formed therein and is a cooled component of the gas turbine engine 10. The cooled turbine vane 300 has a plurality of effusion cooling apertures 50 extending through the convex and concave walls 312 and 314 respectively of the aerofoil portion 304 to cool the aerofoil portion 304 of the turbine vane 300. The effusion cooling apertures 50 are the same as those shown in FIGS. 3 to 8. Each outlet 54 is arranged such that the two of the sides of the rectangular shape which extend laterally extend radially of the turbine vane 300 and the two of the sides of the rectangular shape which extend longitudinally extend axially of the turbine vane 300. The effusion cooling apertures 50 are arranged in axially spaced rows and the apertures 50 in each row are radially spaced apart. The effusion cooling apertures 50 in each row are offset radially from the effusion cooling apertures 50 in each adjacent row.

In operation coolant, for example air supplied from the high pressure compressor 14 of the gas turbine engine 10, is supplied into the passages within the turbine vane 300 and the coolant flows through the effusion cooling apertures 50 from the first surface 41 to the second surface 43 of the convex and concave walls 312 and 314 respectively of the aerofoil portion 304. The flow of coolant through the effusion cooling apertures 50 exits the effusion cooling apertures 50 and then flows over the second surfaces 43 of the convex and concave walls 312 and 314 respectively of the aerofoil portion 304 to form a film of coolant on the second surfaces 43 of the convex and concave walls 312 and 314 respectively of the aerofoil portion 304.

The turbine blade 200 may additionally have effusion cooling apertures in the platform portion 206 and/or the turbine vane 300 may additionally have effusion cooling apertures in the inner and/or outer platform portions 302 and 304 respectively.

The cooled component may comprise a second wall, the second wall being spaced from the first surface of the wall, the second wall having a third surface and a fourth surface, the fourth surface of the second wall being spaced from the first surface of the wall and the second wall having a plurality of impingement cooling apertures extending therethrough from the third surface to the fourth surface.

The metering portion of the effusion cooling apertures have a length of 0.3 mm and a width of 2.4 mm, the metering portion of the effusion cooling apertures is arranged at an angle of 16° to the first surface, a first surface of the diffusing portion of the effusion cooling aperture is arranged at an angle of 16° to the second surface, a second opposite surface of the diffusing portion is arranged at an angle of 6° to the first surface of the diffusing portion of the effusion cooling aperture to form the diffusing portion.

The effusion cooling apertures in each row may be spaced apart by 3.4 mm in the second surface and the effusion cooling apertures in adjacent rows may be spaced apart by 4.7 mm in the second surface.

Figure 13:
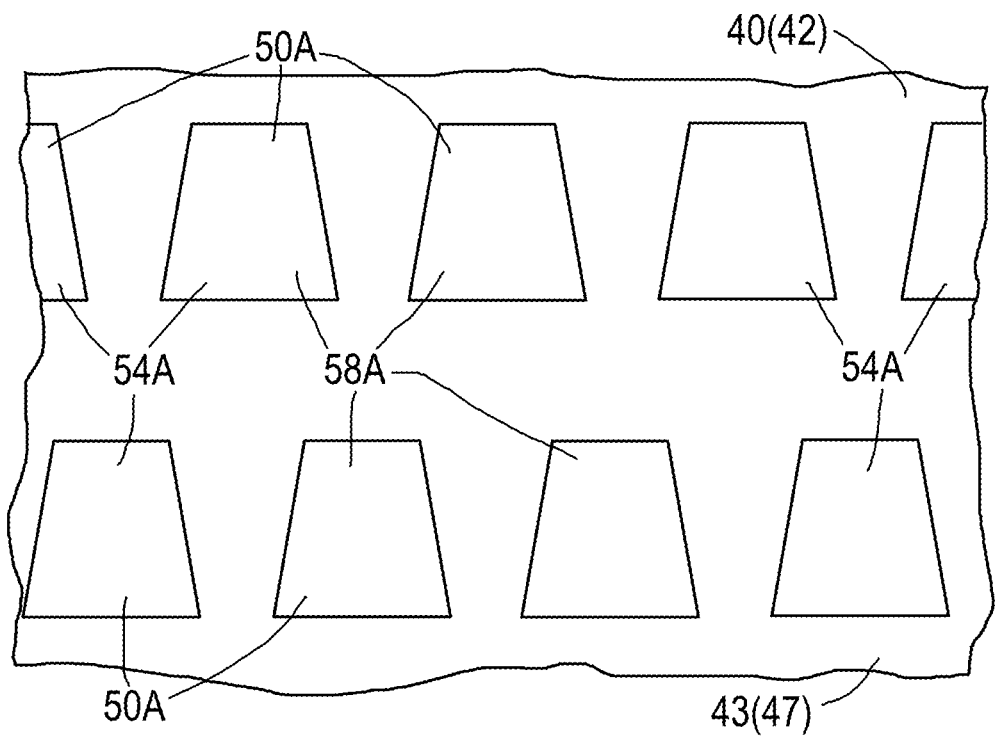
FIG. 13 is an alternative view of the cooled combustion chamber wall in the direction of arrow A in FIG. 3.

In an alternative arrangement each of the present disclosure each outlet 54A has an isosceles trapezium shape in the plane of the second surface 43 of the radially inner annular wall 40, as shown in FIG. 13. Each outlet 54A is arranged such that two of the sides of the isosceles trapezium shape extend laterally and two of the sides of the isosceles trapezium shape extend longitudinally and laterally and in particular two of the sides of the isosceles trapezium shape which extend laterally extend circumferentially of the radially inner annular wall 40 and the two of the sides of the isosceles trapezium shape which extend longitudinally and laterally extend axially and circumferentially of the radially inner annular wall 40. The effusion cooling apertures 50A are arranged in longitudinally spaced rows and the apertures 50A in each row are laterally spaced apart and in particular the effusion cooling apertures 50A are arranged in axially spaced rows and the apertures 50A in each row are circumferentially spaced apart. The effusion cooling apertures 50A in each row are offset laterally from the effusion cooling apertures 50A in each adjacent row and in particular the effusion cooling apertures 50A in each row are offset circumferentially from the effusion cooling apertures 50A in each adjacent row. The downstream side of each effusion cooling aperture 50A is longer than the upstream side of the effusion cooling aperture 50A. This arrangement is also applicable to the turbine blade shown in FIG. 10 or the turbine vane shown in FIG. 11 but the lateral direction corresponds to a radial direction and the longitudinal direction corresponds to the axial direction.

Figure 14:
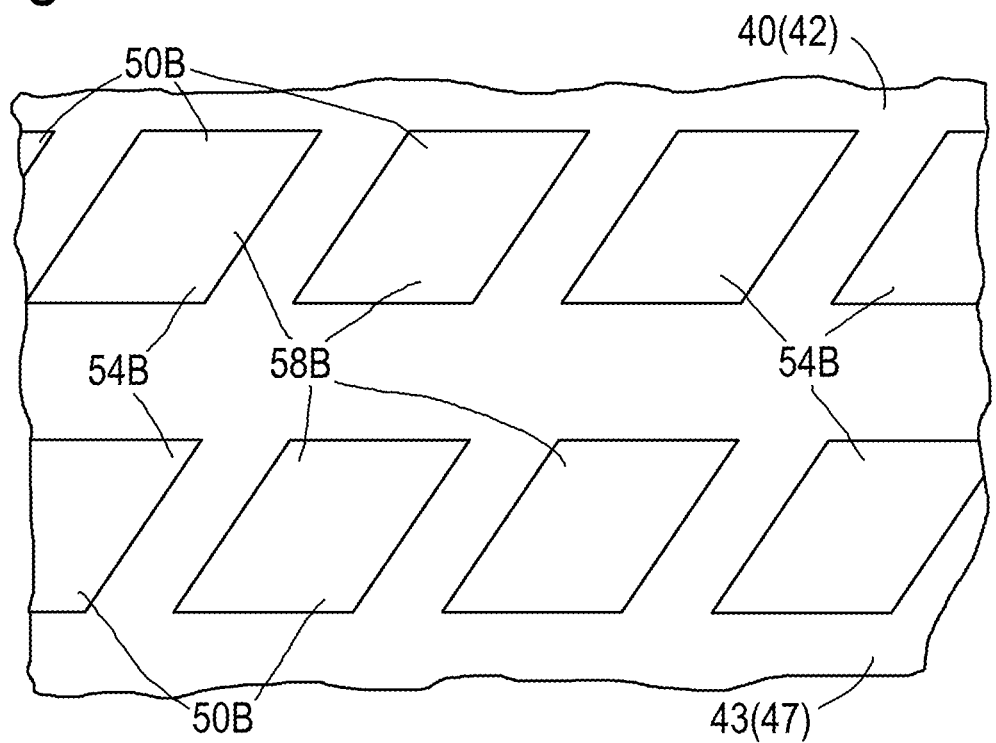
FIG. 14 is a further view of the cooled combustion chamber wall in the direction of arrow A in FIG. 3.

In an alternative arrangement each of the present disclosure each outlet 54B has an rhombus shape in the plane of the second surface 43 of the radially inner annular wall 40, as shown in FIG. 14. Each outlet 54B is arranged such that two of the sides of the rhombus shape extend laterally and two of the sides of the rhombus shape extend longitudinally and laterally and in particular two of the sides of the rhombus shape which extend laterally extend circumferentially of the radially inner annular wall 40 and the two of the sides of the rhombus shape which extend longitudinally and laterally extend axially and circumferentially of the radially inner annular wall 40. The effusion cooling apertures 50B are arranged in longitudinally spaced rows and the apertures 50B in each row are laterally spaced apart and in particular the effusion cooling apertures 50B are arranged in axially spaced rows and the apertures 50B in each row are circumferentially spaced apart. The effusion cooling apertures 50B in each row are offset laterally from the effusion cooling apertures 50B in each adjacent row and in particular the effusion cooling apertures 50B in each row are offset circumferentially from the effusion cooling apertures 50B in each adjacent row. This arrangement is also applicable to the turbine blade shown in FIG. 10 or the turbine vane shown in FIG. 11 but the lateral direction corresponds to a radial direction and the longitudinal direction corresponds to the axial direction.

It is to be noted that the effusion cooling apertures are inclined in the direction of flow of the hot gases over the cooled component.

The cooled components, the cooled combustor chamber wall, the cooled combustion chamber combustor tile, the cooled combustion chamber heat shield, the cooled combustion chamber wall segment, the cooled turbine blade, the cooled turbine vane or cooled turbine shroud are preferably formed by additive layer manufacturing, for example direct laser deposition, selective laser sintering or direct electron beam deposition. The cooled component is built up layer by layer using additive layer manufacturing in the longitudinal, axial, direction of the wall which corresponds to the direction of flow of hot gases over the second surface of the wall.

The cooled combustion chamber walls in FIG. 2 may be manufactured by direct laser deposition in a powder bed by producing a spiral shaped wall sintering the powder metal layer by layer, (in the longitudinal, axial, direction of the wall) and then unravelling and welding, bonding, brazing or fastening the ends of what was the spiral shaped wall together to form an annular combustion chamber wall. The combustion chamber tiles of FIG. 9 may be manufactured by direct laser deposition in a powder bed by sintering the powder metal layer by layer in the longitudinal, axial, direction of the combustion chamber tile. The combustion chamber segments of FIG. 10 may be manufactured by direct laser deposition in a powder bed by sintering the powder metal layer by layer in the longitudinal, axial, direction of the combustion chamber tile.

Additive layer manufacturing enables the effusion cooling apertures to have diffusing portions which have a layback angle and the layback angle inclines the resultant effusion flow of coolant closer to the surface of the wall of the cooled component and to diffuse the flow of coolant to reduce the exit velocity of the coolant. The effusion cooling apertures diffuse the flow of coolant in a direction perpendicular, normal, to the surface of the cooled component. The effusion cooling apertures have a high aspect ratio, ratio of width to length, and a low height in the metering portion of the effusion cooling apertures and this provides a high surface area to volume ratio which increases, maximises, the transfer of heat from the wall of the cooled component into the coolant flowing through the effusion cooling apertures. The outlets of the effusion cooling apertures in the surface of the cooled component are effectively recessed into the surface of the wall of the cooled component and each of these recesses ensures that the coolant is more resistant to mixing with the hot gases and further enhances the overall cooling effectiveness. The inlets of the effusion cooling apertures are arranged diametrically and are curved so that the effusion cooling apertures may be manufactured by additive layer manufacturing processes.

The use of the double wall cooled component has shown a 100° C. temperature benefit compared to conventionally cooled components, e.g. with conventional impingement cooling apertures in one wall and conventional effusion cooling apertures in a second wall.

Each effusion cooling aperture has a diagonal slotted inlet, a metering portion to throttle and control the flow of coolant into the inlet, and an aerodynamic diffusion portion which has a layback angle to angle the coolant more closely onto the surface of the wall of the cooled component.

Although the present disclosure has been described with reference to effusion cooling apertures with rectangular shape, square shape, isosceles trapezium shape and rhombus shape outlets it may be possible to use parallelogram shapes or any other suitable quadrilateral shape.

The cooled components comprise a superalloy, for example a nickel, or cobalt, superalloy. The use of the effusion cooling apertures of the present disclosure may enable less temperature resistant superalloys to be used to manufacture the cooled component and hence reduce the cost of the cooled component or alternatively enable the high temperature resistant superalloys used to manufacture cooled components to operate at higher temperatures.

The cooled component may be a turbine blade, a turbine vane, a combustion chamber wall, a combustion chamber tile, a combustion chamber heat shield, a combustion chamber wall segment or a turbine shroud.

The cooled component may be a gas turbine engine component or other turbomachine component, e.g. a steam turbine, or an internal combustion engine etc.

The gas turbine engine may be an aero gas turbine engine, an industrial gas turbine engine, a marine gas turbine engine or an automotive gas turbine engine. The aero gas turbine engine may be a turbofan gas turbine engine, a turbo-shaft gas turbine engine, a turbo-propeller gas turbine engine or a turbojet gas turbine engine.

The invention claimed is:

1. A cooled component comprising:
a wall having a first surface, a second surface, and a thickness between the first surface and the second surface, wherein:
the wall has a plurality of effusion cooling apertures extending there-through from the first surface to the second surface, the plurality of effusion cooling apertures being arranged at an angle with respect to the second surface;
each effusion cooling aperture has (i) an inlet in the first surface, (ii) an outlet in the second surface, and (iii) a metering portion and a diffusing portion arranged in flow series from the inlet to the outlet;
each metering portion is elongate and, in a cross-section perpendicular to the first and second surfaces, has a height in a direction parallel to the thickness and a width in a lateral direction perpendicular to the height that is greater than the height;
in a longitudinal direction parallel to the first and second surfaces and perpendicular to the lateral direction, each outlet has an increased length compared to a length of the inlet, each outlet also having a quadrilateral shape in the second surface of the wall;
each inlet has an elongate shape in the first surface of the wall and has a longitudinal axis in the first surface that is arranged diagonally relative to edges connecting corners of the outlets;
each inlet has (i) an upstream end wall upstream in a direction of air flow over the first surface, (ii) a downstream end wall downstream of the upstream end wall in the direction of air flow, and (iii) side walls connecting the upstream and downstream end walls, one of the side walls being upstream of the other of the side walls in the direction of air flow, and a downstream end of the upstream side wall being upstream of an upstream end of the downstream side wall in the direction of air flow; and
the metering portion of each effusion cooling aperture gradually changes the effusion cooling aperture from the elongate, diagonally-arranged shape at the inlet to a quadrilateral shape at a junction of the metering portion and the diffusing portion of the effusion cooling aperture.

2. The cooled component of claim 1, wherein each outlet has a shape selected from one of: a rhombus shape and an isosceles trapezium shape.

3. The cooled component of claim 1, wherein each outlet has a rectangular shape, two sides of the rectangular shape extending laterally and two sides of the rectangular shape extending longitudinally.

4. The cooled component of claim 2, wherein each outlet is arranged such that two sides of the shape extend laterally and two sides of the shape extend longitudinally and laterally.

5. The cooled component of claim 1, wherein:
the upstream end wall is concave, the downstream end wall is convex, and the side walls are each concave.

6. The cooled component of claim 5, wherein the upstream and downstream end walls diverge in the longitudinal, axial, direction of the wall.

7. The cooled component of claim 1, wherein the plurality of effusion cooling apertures are arranged in longitudinally spaced rows and the effusion cooling apertures in each row are laterally spaced apart.

8. The cooled component of claim 7, wherein the plurality of effusion cooling apertures in each row are offset laterally from the effusion cooling apertures in each adjacent row.

9. The cooled component of claim 1, wherein a ratio of the width of each metering portion to the height of the metering portion is from 3 to 1 to 8 to 1.

10. The cooled component of claim 1, wherein each metering portion is arranged at an angle of between 10° and 20° to the first surface.

11. The cooled component of claim 1, wherein:
the height of the metering portion of each of the plurality of effusion cooling apertures is 0.3 mm, the width of the metering portion is 0.9 mm, and the metering portion is arranged at an angle of 12° to the first surface of the wall;

a first surface of the diffusing portion of each of the plurality of effusion cooling apertures is arranged at an angle of 12° to the second surface of the wall; and
a second opposite surface of the diffusing portion of each of the plurality of effusion cooling apertures is arranged at an angle of 7° to the first surface of the diffusing portion to form the diffusing portion.

12. The cooled component of claim 1, wherein:
the height of the metering portion of each of the plurality of effusion cooling apertures is 0.3 mm, the width of the metering portion is 0.9 mm, and the metering portion is arranged at an angle of 17° to the first surface of the wall;
a first surface of the diffusing portion of each of the plurality of effusion cooling apertures is arranged at an angle of 17° to the second surface of the wall; and
a second opposite surface of the diffusing portion of each of the plurality of effusion cooling apertures is arranged at an angle of 6° to the first surface of the diffusing portion to form the diffusing portion.

13. The cooled component of claim 1, further comprising a second wall, wherein:
the second wall has a third surface and a fourth surface, the fourth surface being spaced apart from the first surface of the wall; and
the second wall has a plurality of impingement cooling apertures extending there-through from the third surface to the fourth surface.

14. The cooled component of claim 13, wherein:
the height of the metering portion of each of the plurality of effusion cooling apertures is 0.3 mm, the width of the metering portion is 2.4 mm, and the metering portion is arranged at an angle of 16° to the first surface of the wall;
a first surface of the diffusing portion of each of the effusion cooling apertures is arranged at an angle of 16° to the second surface of the wall; and
a second opposite surface of the diffusing portion is arranged at an angle of 6° to the first surface of the diffusing portion to form the diffusing portion.

15. The cooled component of claim 1, wherein the cooled component is selected from the group consisting of: a turbine blade, a turbine vane, a combustion chamber wall, a combustion chamber tile, a combustion chamber heat shield, a combustion chamber wall segment and a turbine shroud.

16. The cooled component of claim 15, wherein:
the cooled component is an annular combustion chamber wall; and
each outlet of the annular combustion chamber wall has a rectangular shape, two sides of the rectangular shape extending circumferentially of the combustion chamber wall and two sides of the rectangular shape extending axially of the combustion chamber wall.

17. The cooled component of claim 15, wherein:
the cooled component is a combustion chamber tile for an annular combustion chamber wall; and
each outlet of the combustion chamber tile has the quadrilateral shape, two sides of the shape extending circumferentially of the combustion chamber tile and two sides of the shape extending axially of the combustion chamber tile.

18. The cooled component of claim 15, wherein:
the cooled component is a combustion chamber wall segment for an annular combustion chamber wall;
the combustion chamber wall segment comprises an outer wall and an inner wall spaced apart from the outer wall, the outer wall having a plurality of impingement cooling apertures and the inner wall having the plurality of effusion cooling apertures; and
each outlet of the effusion cooling apertures of the inner wall is arranged such that two sides of the quadrilateral shape extend in a circumferential direction of the combustion chamber wall segment and two sides of the quadrilateral shape extend in an axial direction of the combustion chamber wall segment.

19. The cooled component of claim 15, wherein:
the cooled component is the turbine blade or the turbine vane; and
each outlet of the turbine blade or turbine vane is arranged such that two sides of the quadrilateral shape extend radially of the turbine blade or turbine vane and two sides of the quadrilateral shape extend axially of the turbine blade or turbine vane.

20. The cooled component of claim 1, wherein the cooled component comprises a superalloy.

21. The cooled component of claim 1, wherein the cooled component is manufactured by additive layer manufacturing.

22. The cooled component of claim 1, wherein the cooled component is selected from the group consisting of a gas turbine engine component, a turbomachine component and an internal combustion engine component.

23. A cooled component comprising:
a wall having a first surface, a second surface, and a thickness between the first surface and the second surface, wherein:
the wall has a plurality of effusion cooling apertures extending there-through from the first surface to the second surface, the plurality of effusion cooling apertures being arranged at an angle with respect to the second surface;
each effusion cooling aperture has (i) an inlet in the first surface, (ii) an outlet in the second surface, and (iii) a metering portion and a diffusing portion arranged in flow series from the inlet to the outlet;
each metering portion is elongate and, in a cross-section perpendicular to the first and second surfaces, has a height in a direction parallel to the thickness and a width in a lateral direction perpendicular to the height that is greater than the height;
each outlet has an increased length compared to a length of the inlet, each outlet also having a quadrilateral shape in the second surface of the wall;
each inlet has an elongate shape in the first surface of the wall;
at least one of the inlets in the first surface of the wall has a longitudinal axis in the first surface that is arranged diagonally relative to edges connecting corners of the outlets;
each inlet has (i) an upstream end wall upstream in a direction of air flow over the first surface, (ii) a downstream end wall downstream of the upstream end wall in the direction of air flow, and (iii) side walls connecting the upstream and downstream end walls, one of the side walls being upstream of the other of the side walls in the direction of air flow, and a downstream end of the upstream side wall being upstream of an upstream end of the downstream side wall in the direction of air flow; and
the metering portion of each effusion cooling aperture gradually changes the effusion cooling aperture from the elongate shape at the inlet to a quadrilateral shape at a junction of the metering portion and the diffusing portion of the effusion cooling aperture.

\* \* \* \* \*